US007792675B2

(12) United States Patent
Ramaswamy et al.

(10) Patent No.: US 7,792,675 B2
(45) Date of Patent: Sep. 7, 2010

(54) SYSTEM AND METHOD FOR AUTOMATIC MERGING OF MULTIPLE TIME-STAMPED TRANSCRIPTIONS

(75) Inventors: Veeru Ramaswamy, Jackson, NJ (US); Bernard Brafman, Chesapeake, VA (US)

(73) Assignee: Vianix Delaware, LLC, Virginia Beach, VA (US)

( * ) Notice: Subject to any disclaimer, the term of this patent is extended or adjusted under 35 U.S.C. 154(b) by 809 days.

(21) Appl. No.: 11/788,814

(22) Filed: Apr. 20, 2007

(65) Prior Publication Data

US 2007/0250316 A1    Oct. 25, 2007

Related U.S. Application Data

(60) Provisional application No. 60/793,391, filed on Apr. 20, 2006, provisional application No. 60/793,601, filed on Apr. 20, 2006.

(51) Int. Cl.
*G10L 15/26* (2006.01)
(52) U.S. Cl. ...................................................... 704/270
(58) Field of Classification Search .................. 704/270
See application file for complete search history.

(56) References Cited

U.S. PATENT DOCUMENTS

| 7,421,155 B2 * | 9/2008 | King et al. | 382/312 |
| 7,668,718 B2 * | 2/2010 | Kahn et al. | 704/270 |

* cited by examiner

*Primary Examiner*—Susan McFadden
(74) *Attorney, Agent, or Firm*—Stoll Keenon Ogden PLLC; David J. Clement; Justin M. Tromp

(57) ABSTRACT

A system for automatically merging multiple time-stamped transcriptions is provided. The system includes a transcription server for receiving a signal having time-stamp information, a splitter, a merging utility, and a text output. A method for automatic merging of multiple time-stamped transcriptions comprises the following steps: transferring a signal having timestamp information encoded therein to a splitter which yields a mixed audio output having resultant corresponding audio channels, transferring the mixed audio output to a transcriber server which thereby yields one or more text outputs, and the text outputs being merged by a merging utility with the timestamps included in the signal thereby providing a single text file.

15 Claims, 5 Drawing Sheets

Hi, Ken. Is that report done?

I'll have it in an hour.

Did you include the Whynot account? Oh, wait. I have another call

Fig. 5

SYSTEM AND METHOD FOR AUTOMATIC MERGING OF MULTIPLE TIME-STAMPED TRANSCRIPTIONS

MULTIPLE EMBODIMENTS AND ALTERNATIVES

Figure 1:
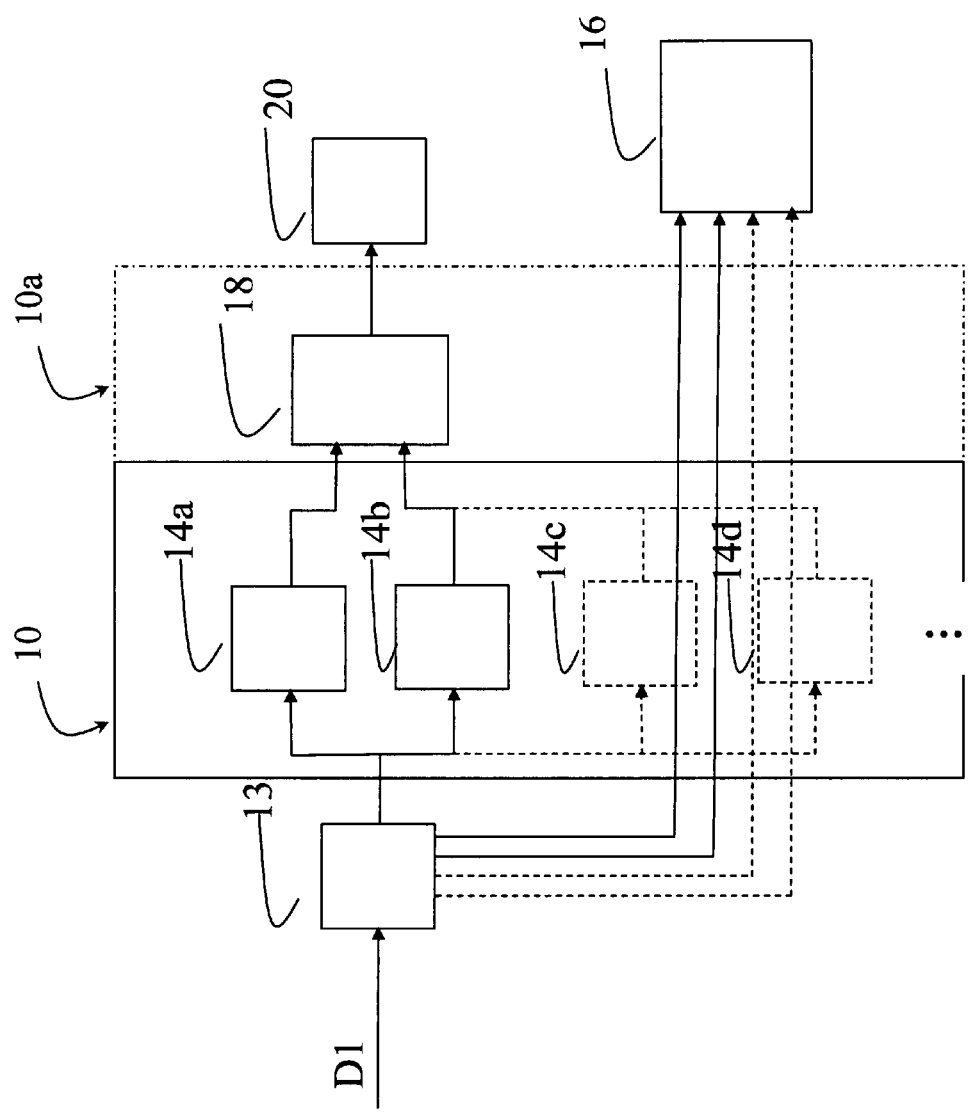
FIG. 1 is a diagrammatic representation of the system and method for automatically merging multiple time-stamped transcriptions without compression according to an embodiment.

Referring to FIG. 1, a system for automatically merging multiple time-stamped transcriptions includes a transcriber server 10, 10a for receiving a signal D1 having time-stamp information. The system also includes a splitter 13 which sends one or more separate channels to a merging utility 18 which then provides a text output 20. The signal D1 can be a recording of one or more channels. An alternative is to provide a signal D1 which is a duplex conversation or even a duplex telephone conversation.

Alternative embodiments of the system and of the method provide that the merging utility 18 may operate either as part of the transcriber server 10a or separate from the transcriber server 10. In embodiments where the merging utility 18 operates as part of the transcriber server 10a, the transcriber server is labeled as 10a in the Figures thereby placing the merging utility 18 inside the transcriber server 10a. When the merging utility 18 operates apart from the transcriber server 10, then the transcriber server is labeled as 10 in the Figures thereby placing the merging utility 18 outside the transcriber server 10.

Figure 2:
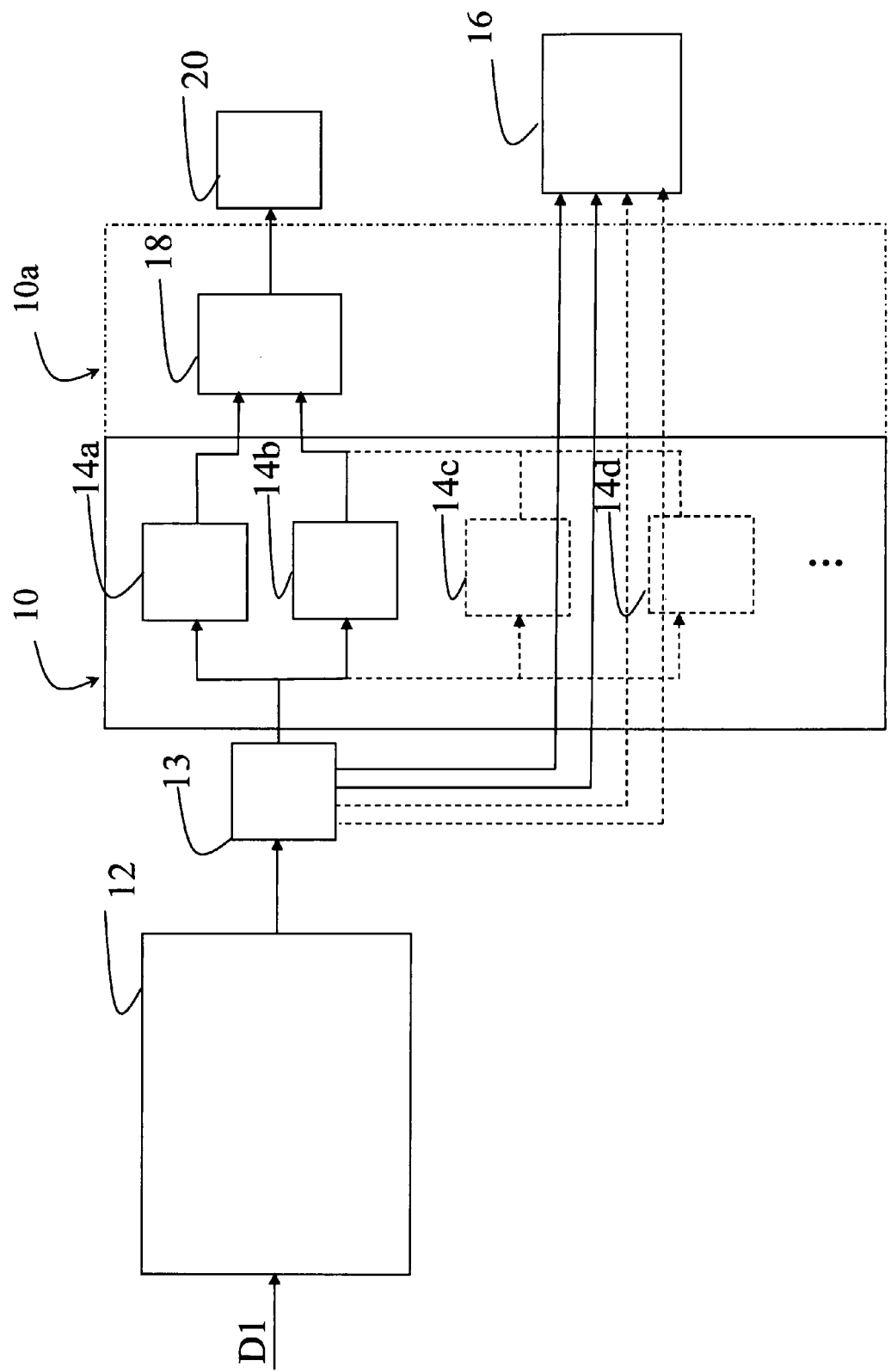
FIG. 2 is a diagrammatic representation of the system and method for automatically merging multiple time-stamped transcriptions with compression according to another embodiment.

Referring now to FIG. 2, an embodiment of the system for automatically merging multiple time-stamped transcriptions includes a device such as, for example, a telephone, a cellular telephone, a dictation system, a PDA, a smart phone, or another device (not shown) including an assembly within the device (not shown) for recording conversations. Also included is a compressor 11, a decompressor 12, a transcriber server 10, 10a, a mixed audio output 16, and one or more separate text outputs 14a through 14d being merged by a merging utility 18 into a single text file 20. An embodiment of the system for automatically merging multiple time-stamped transcriptions provides that neither or both of the compressor and decompressor arrangements incorporate Managed Audio Sound Compression, a technology proprietary to Vianix Delaware, LLC.

Referring again to FIG. 1, a method for automatic merging of multiple time-stamped transcriptions includes the steps of transferring a signal D1 having timestamp information encoded therein to a splitter 13. The splitter 13 yields a mixed audio output 16 and each resultant corresponding audio channel is passed through a transcriber server 10, 10a thereby yielding one or more text outputs 14a through 14d. The text outputs 14a through 14d are merged by a merging utility 18 with the timestamps included in the signal D1 thereby providing a single text file 20. Although the Figures show two text outputs 14a and 14b present with two more 14c and 14d optionally present, the signal D1 may be comprised of one or more channels commensurate with the number of text outputs 14a through 14d present. Alternative embodiments provide one or more text outputs and such representation in the Figures would be noted by the use of sequential letters after 14d, such as, for example, a 10-channel conversation having corresponding text outputs of 14a through 14j. In embodiments of even more channels, more reference letters are to be read into the teaching reflected herein and in the Figures. The signal is comprised of one or more channels and each channel may further correspond to a voice or speaker. The text outputs 14a through 14d may be aligned by time and by voice or speaker thereby producing a single-text version of an original conversation. Alternative embodiments provide that the text outputs 14a through 14d include timestamps aligned by speaker thereby providing speaker identification as well as a record of the speech of each speaker. In alternative embodiments, the signal D1 provides a mixed audio output 16 as an additional output along with the text outputs 14a through 14d wherein both the mixed audio output 16 and the text outputs 14a through 14d include timestamps aligned by speaker thereby providing speaker identification as well as a record of the speech of each speaker.

Referring to FIG. 2, a further embodiment provides a method for automatic merging of multiple time-stamped transcriptions comprising the steps of compressing a signal D1 having timestamp information encoded therein, transferring the compressed signal D1 to a decompressor 12 which yields one or more decompressed audio signals D1 and then passes the now decompressed audio signals D1 through a splitter 13. The splitter 13 yields a mixed audio output 16 and each resultant corresponding audio channel is transferred to a transcriber server 10, 10a thereby yielding one or more text outputs 14a through 14d. The text outputs 14a through 14d are merged by a merging utility 18 with the timestamps included in the signal D1 thereby providing a single text file 20. Again, alternative embodiments provide that the merging utility 18 may operate either separate from or as part of the transcriber server 10, 10a, respectively, and the embodiments reflect either alternative. The signal D1 may be comprised of one or more channels. Each channel may further correspond to a voice or speaker. The single text file 20 may be aligned by time and by voice or speaker thereby producing a single-text version of the related audio signal. Alternative embodiments provide that the text outputs 14a through 14d include timestamps aligned by speaker thereby providing speaker identification as well as a record of the speech of each speaker. Alternate embodiments also include a mixed audio output 16 integrated within the text outputs 14a through 14d and as part of the signal D1 and wherein both the mixed audio output 16 and the text outputs 14a through 14d include timestamps aligned by speaker thereby providing speaker identification as well as a record of the speech of each speaker.

Figure 3:
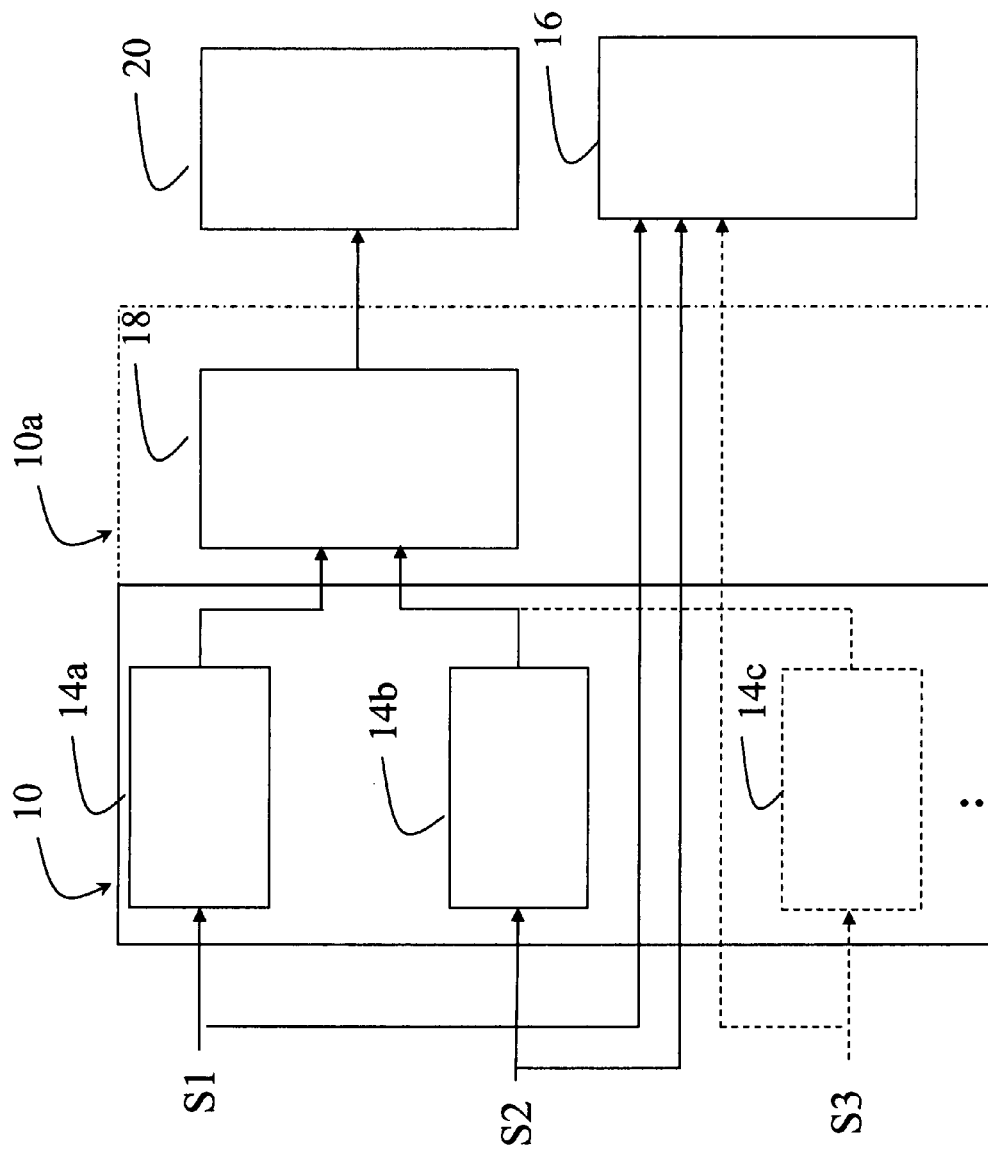
FIG. 3 is a diagrammatic representation of the system and method for automatically merging multiple time-stamped transcriptions without compression and related to cellular telephones according to an embodiment.
Figure 4:
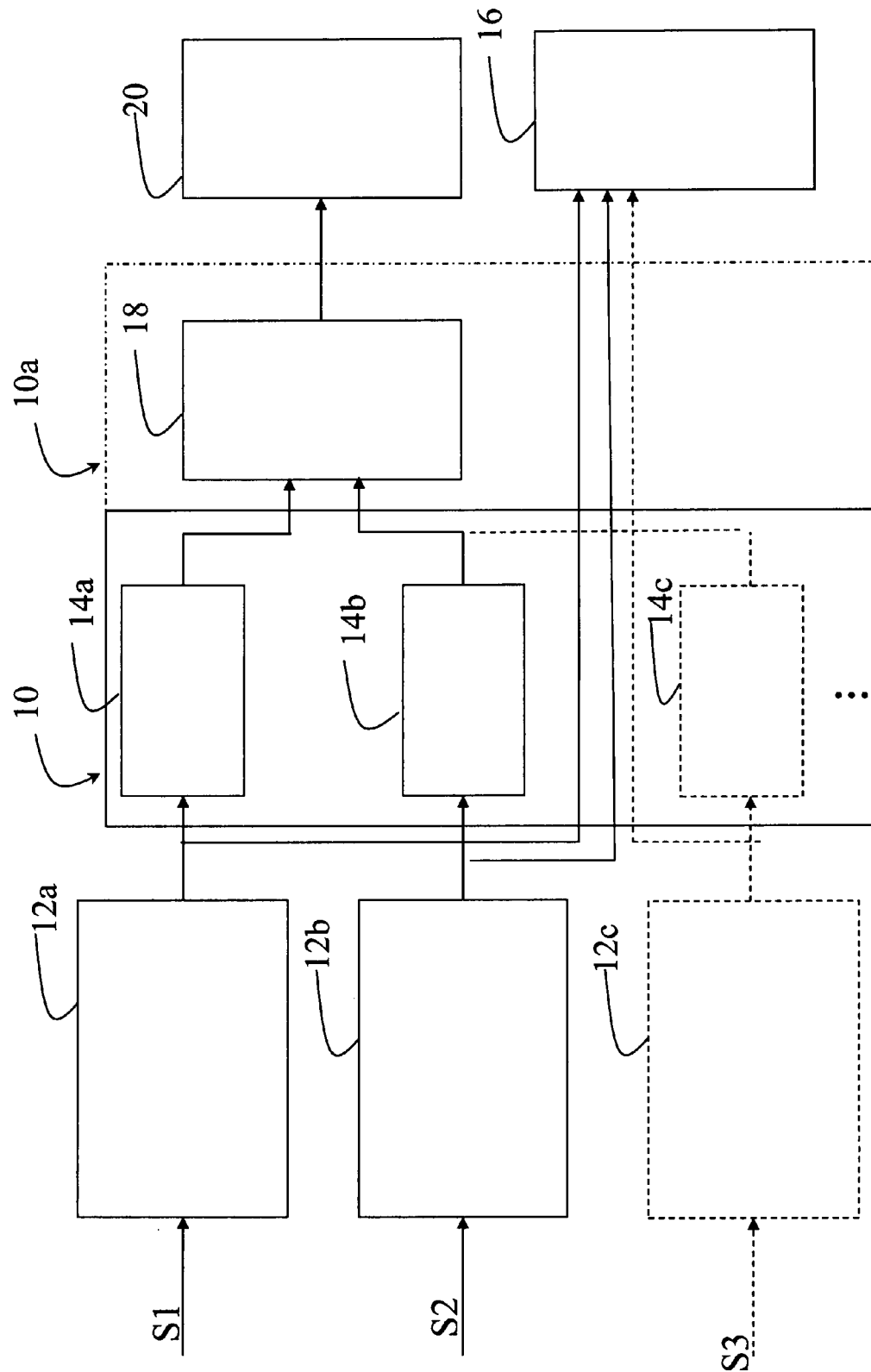
FIG. 4 is a diagrammatic representation of the system and method for automatically merging multiple time-stamped transcriptions with compression and related to cellular telephones according to another embodiment; and, FIG. 5 is a block diagram of a single text file from a system for recording and transcribing cellular telephone conversations in accordance with a preferred embodiment of the present invention.

With regard to telephone conversations, and as shown in FIG. 3 for embodiments where no compression/decompression is provided, and FIG. 4, for embodiments where compression/decompression is provided, in alternative embodiments, a signal S1 through S3 is transferred to a transcriber server 10, 10a providing text outputs 14a through 14d which are transferred to a merging utility 18 from a device selected from a group including telephones, cellular telephones, pocket PC's, PDA's, internet protocol-enabled devices, and other wired or wireless devices. Additionally, text outputs 14a through 14d and an associated mixed audio output 16 may be transmitted to either or both of designated email addresses and an originating device.

In operation, at any point during a made or received call between two parties, duplex recording may be started. In alternative embodiments where there are two or more parties, conference or multi-party recording may be started. Likewise, in embodiments where only a single party is involved, such as, for example, in recording a memorandum to be used later, then a single-channel recording may be started. Such recording may occur with or without permission of the parties and users should check local legal regulations regarding the recording of telephone conversations.

The process may begin manually or automatically. A manual start will include a single button press whether dedicated or configurable hot keys are used in the telephone. In automatic operation, recordings can be made based on specific incoming or outgoing calls to or from specific or rule-based numbers. Each channel is recorded separately and time-stamped and may or may not be compressed. Use of the MASC encoding technology is provided in alternative embodiments. Pressing "end" stops the recording and, at that time, the user is provided a choice as to whether or not to automatically email the recording to the transcriber server 10, 10a. Alternative embodiments provide that a macro may be programmed into the system for automatically transmitting the files upon pressing "end". The user may also manually transfer the recording of the conversation via means such as, for example, email, Bluetooth, WiFi, hotsync, activesync, IrDA, USB, SMS, or MMS. The user can selectably rewind, fast forward, play and edit a mixed version of the recordings corresponding to each channel, including sortable stored recordings through a user interface.

Embodiments provide a version of the system that does not involve a transcriber server 10, 10a as well as versions that use the transcriber server 10, 10a. When used, the decompressor 12 decodes the MASC files. The transcriber server 10, 10a then performs automatic speech recognition-based transcription of the recordings, and uses a merging utility 18 to merge the transcriptions using the time stamps in the original signal into a single text file 20 including the resolution of instances of coincident speaking. As shown in FIG. 5, merged text is presented in a manner to both show and resolve any overlapped text output resulting from coincident speaking. The recordings are mixed into a mixed audio output 16, and a single text file 20 and the transcriber server 10, 10a may email either or both to a preset email address which may or may not be at the originating device.

Multiple embodiments provide additional functionality in the form of memory management which is configurable to provide an audible warning on low memory, configurable for automatic buffering to the transcriber server 10, 10a via email and configurable for dispensation of recordings. Also provided is an easy method to manually email/SMS/MMS recordings via a phonebook. Conversations may be performed over technology such as, for example, wired such as PSTN or ISDN, wireless such as GSM or CDMA, or VoIP (voice over internet protocol) networks such as Session Initiation Protocol (SIP) or H.323.

Embodiments may take several business-related forms including licensing of the system to service providers that may offer a transcription service or partner themselves with ASR server providers. The service may be also provided to end users with downloadable applications for capable handsets.

The system and method carried out by the alternative embodiments involve certain predetermined manipulations of electronic equipment such as the aforesaid transcriber server 10, 10a. The steps necessary to carry out the method of the present invention on the presently defined system may be preprogrammed software, preprogrammed hardware, or other devices capable of electronically administering the necessary functions. While the details of such a function structure are not recited in the present teachings, it will be understood by those skilled in the art that it is within their capability to provide preprogrammed functions in the necessary formats to carry out the method of the multiple embodiments contemplated herein.

It will therefore be readily understood by those persons skilled in the art that the present embodiments are susceptible of a broad utility and application. While the present embodiments are described in all currently foreseeable alternatives, there may be other, unforeseeable embodiments, alternatives, and adaptations, as well as variations, modifications and equivalent arrangements that do not depart from the substance or scope of the present embodiments and alternatives. The foregoing disclosure is not intended or to be construed to limit or otherwise to exclude such other embodiments, alternatives, adaptations, variations, modifications and equivalent arrangements, the present embodiments being limited only by the claims appended hereto and the equivalents thereof.

We claim:

1. A system for automatically merging multiple time-stamped transcriptions comprising:
   a transcriber server for receiving a signal having timestamp information;
   a splitter;
   a merging utility; and,
   a text output.

2. The system for automatically merging multiple time-stamped transcriptions of claim 1 wherein the signal is a recording of one or more channels.

3. The system for automatically merging multiple time-stamped transcriptions of claim 1 wherein the signal is a recording of a duplex conversation.

4. The system for automatically merging multiple time-stamped transcriptions of claim 1 wherein the signal is a recording of a duplex telephone conversation.

5. A method for automatic merging of multiple time-stamped transcriptions comprising the steps of:
   transferring a signal having timestamp information encoded therein to a splitter;
   the splitter yielding a mixed audio output having resultant corresponding audio channels;
   transferring the mixed audio output to a transcriber server;
   the transcriber server thereby yielding one or more text outputs; and,
   the text outputs being merged by a merging utility with the timestamps included in the signal thereby providing a single text file.

6. The method for automatic merging of multiple time-stamped transcriptions according to claim 5 wherein the merging utility operates as part of the transcriber server.

7. The method for automatic merging of multiple time-stamped transcriptions according to claim 5 wherein the merging utility operates separate from the transcriber server.

8. The method for automatic merging of multiple time-stamped transcriptions according to claim 5 wherein the signal is comprised of one or more channels.

9. The method for automatic merging of multiple time stamped transcriptions according to claim 5 wherein the signal is comprised of one or more channels and each channel corresponds to a voice or speaker.

10. The method for automatic merging of multiple time-stamped transcriptions according to claim 9 wherein the text outputs are aligned by time and by voice or speaker thereby producing a single-text version of an original conversation.

11. The method for automatic merging of multiple time-stamped transcriptions according to claim 10 wherein the text outputs include timestamps aligned by speaker thereby providing speaker identification as well as a record of the speech of each speaker.

12. The method for automatic merging of multiple time-stamped transcriptions according to claim 11 wherein a mixed audio output is also provided by the signal as an additional output along with the text outputs and wherein both the mixed audio output and the text outputs include timestamps aligned by speaker thereby providing speaker identification as well as a record of the speech of each speaker.

13. The method for automatic merging of multiple time-stamped transcriptions according to claim 5 wherein the signal having timestamp information encoded therein is transferred to a transcriber server from a device selected from a group including telephones, cellular telephones, pocket PC's, PDA's, internet protocol-enabled devices, and other wired or wireless devices.

14. The method for automatic merging of multiple time-stamped transcriptions according to claim 13 wherein text outputs and a mixed audio output are transmitted to a group including either or both of designated email addresses and an originating device.

15. The method for automatic merging of multiple time-stamped transcriptions according to claim 13 wherein conversations are performed over technology selected from a group including wired PSTN or ISDN, wireless GSM or CDMA, or VOIP (voice over internet protocol) from a group including Session Initiation Protocol (SIP) or H.323.

* * * * *